United States Patent
Su et al.

(10) Patent No.: US 12,176,551 B2
(45) Date of Patent: Dec. 24, 2024

(54) BATTERY CELL, BATTERY, ELECTRICAL DEVICE, AND MANUFACTURING METHOD AND DEVICE FOR BATTERY CELL

(71) Applicant: CONTEMPORARY AMPEREX TECHNOLOGY (HONG KONG) LIMITED, Hong Kong (CN)

(72) Inventors: Huasheng Su, Ningde (CN); Chengyou Xing, Ningde (CN); Jing Zhang, Ningde (CN); Quankun Li, Ningde (CN); Peng Wang, Ningde (CN); Haizu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 192 days.

(21) Appl. No.: 17/979,009

(22) Filed: Nov. 2, 2022

(65) Prior Publication Data
US 2023/0123556 A1    Apr. 20, 2023

Related U.S. Application Data

(63) Continuation of application No. PCT/CN2021/109911, filed on Jul. 30, 2021.

(51) Int. Cl.
*H01M 50/152* (2021.01)
*H01M 50/627* (2021.01)

(52) U.S. Cl.
CPC ....... *H01M 50/152* (2021.01); *H01M 50/627* (2021.01)

(58) Field of Classification Search
None
See application file for complete search history.

(56) References Cited

U.S. PATENT DOCUMENTS

| | | | |
|---|---|---|---|
| 9,543,559 | B2 | 1/2017 | Urano et al. |
| 2005/0153194 | A1 | 7/2005 | Kimura et al. |

(Continued)

FOREIGN PATENT DOCUMENTS

| | | |
|---|---|---|
| CN | 103515571 A | 1/2014 |
| CN | 104396053 A | 3/2015 |

(Continued)

OTHER PUBLICATIONS

Partial Supplementary European Search Report issued Jun. 3, 2023 in European Patent Application No. 21933486.9, 16 pages.

(Continued)

*Primary Examiner* — Wyatt P McConnell
(74) *Attorney, Agent, or Firm* — XSENSUS LLP

(57) ABSTRACT

A battery cell may include an electrode assembly, a housing and an end cap. The electrode assembly may have a first tab. The housing may have an opening for receiving the electrode assembly. The end cap may include a cap body and a first convex part. The end cap may be provided with a liquid injection hole, and the liquid injection hole may be located inside of the outer peripheral surface of the first convex part. The first convex part may be provided with a flow guiding channel, the flow guiding channel may communicate with the liquid injection hole and penetrate the outer peripheral surface, and the flow guiding channel may be used for allowing at least part of the electrolyte solution to flow to outside of the outer peripheral surface.

12 Claims, 5 Drawing Sheets

(56) References Cited

U.S. PATENT DOCUMENTS

2014/0004411 A1    1/2014   Yokoyama et al.
2015/0194651 A1    7/2015   Urano et al.

FOREIGN PATENT DOCUMENTS

| CN | 207938663 U | | 10/2018 |
|---|---|---|---|
| CN | 213483848 U | | 6/2021 |
| CN | 213484848 | * | 6/2021 |
| CN | 213601921 U | | 7/2021 |
| CN | 213636127 U | | 7/2021 |
| JP | 2016-225014 A | | 12/2016 |

OTHER PUBLICATIONS

International Search Report issued Apr. 13, 2022 in International Patent Application No. PCT/CN2021/109911, 3 pages.

Extended European search report issued on Sep. 13, 2023, in corresponding European patent Application No. 21933486.9, 15 pages.

Office Action issued on Oct. 17, 2023, in corresponding Japanese patent Application No. 2022-554353, 7 pages.

* cited by examiner

BATTERY CELL, BATTERY, ELECTRICAL DEVICE, AND MANUFACTURING METHOD AND DEVICE FOR BATTERY CELL

CROSS-REFERENCE TO RELATED APPLICATIONS

This application is a continuation of International Application No. PCT/CN2021/109911, filed Jul. 30, 2021, which is incorporated herein by reference in its entirety.

TECHNICAL FIELD

The present application relates to the field of battery technology, and in particular, to a battery cell, a battery, an electrical device, and manufacturing method and device for the battery cell.

BACKGROUND ART

Batteries are widely used in electronic devices, such as mobile phones, laptops, battery cars, electric cars, electric planes, electric boats, electric toy cars, electric toy boats, electric toy planes and power tools, etc.

The battery cell generally comprises a housing and an electrode assembly. The housing is used to accommodate the electrode assembly and the electrolyte solution. The electrode assembly generally comprises a positive electrode sheet and a negative electrode sheet. Metal ions (such as, lithium ions) move between the positive electrode sheet and the negative electrode sheet to generate electrical energy.

For common battery cells, it is relatively difficult to inject electrolyte solution into the battery cell through the liquid injection hole, and the injection efficiency is low.

SUMMARY

Embodiments of the present application provide a battery cell, a battery, an electrical device, and a method and a device for manufacturing the battery cell, which can effectively improve the liquid injection efficiency.

In the first aspect, embodiments of the present application provide a battery cell, comprising: an electrode assembly, having a first tab; a housing, having an opening, with the housing configured for accommodating the electrode assembly; and an end cap, comprising a cap body and a first convex part, wherein the cap body is configured for connecting with the housing and covering the opening, the first convex part protrudes from an inner surface of the cap body towards the electrode assembly and abuts against the first tab; the end cap is provided with a liquid injection hole, and the liquid injection hole is configured for allowing electrolyte solution to enter an interior of the battery cell from outside of the battery cell, and the liquid injection hole is located inside of an outer peripheral surface of the first convex part, wherein the first convex part is provided with a flow guiding channel, the flow guiding channel communicates with the liquid injection hole and penetrates the outer peripheral surface, and the flow guiding channel is configured for allowing at least part of the electrolyte solution to flow to outside of the outer peripheral surface.

In the above technical solution, since the first convex part is provided with a flow guiding channel, the flow guiding channel is communicated with the liquid injection hole and penetrates the outer peripheral surface of the first convex part. During the process of injecting the electrolyte solution into the battery cell through the liquid injection hole, the electrolyte solution can flow laterally to outside of the outer peripheral surface of the first convex part through the flow guiding channel, so that the electrolyte solution can quickly flow to the outer circumference of the electrode assembly, improve the smoothness of flowing of the electrolyte solution, effectively improve the injection efficiency, and make the electrolyte solution sufficiently infiltrate the electrode assembly.

In some embodiments, one end of the first convex part away from the cap body is provided with an abutting surface, and the abutting surface is configured for abutting against the first tab; and the end cap is provided with a first concave part which is recessed from the abutting surface in a direction away from the electrode assembly, and the liquid injection hole communicates with the flow guiding channel through the first concave part.

In the above technical solution, the end cap is provided with a first concave part that is recessed from the abutting surface of the first convex part in the direction away from the electrode assembly, and the liquid injection hole is communicated with the flow guiding channel through the first concave part. With such structure, after the electrolyte solution enters the first concave part through the injection hole, a part of the electrolyte solution can directly enter the electrode assembly through the first concave part to infiltrate the electrode sheet, and a part of the electrolyte solution can enter the flow guiding channel through the first concave part and finally flow to outside of the outer peripheral surface of the first convex part, increasing the liquid injection efficiency, while improving the infiltration effect of the electrolyte solution.

In some embodiments, both ends of the flow guiding channel penetrate through the outer peripheral surface and an inner peripheral surface of the first concave part, respectively.

In the above technical solution, the two ends of the flow guiding channel penetrate through the outer peripheral surface and the inner peripheral surface of the first concave part respectively, which is conducive for the electrolyte solution to enter the flow guiding channel from the first concave part, and facilitates the electrolyte solution to laterally flow to outside of the outer peripheral surface of the first convex part.

In some embodiments, the end cap has a liquid outlet surface, one end of the liquid injection hole penetrates the liquid outlet surface, and the liquid outlet surface is located within the first concave part; and in a thickness direction of the end cap, the liquid outlet surface is further away from the electrode assembly than the abutting surface.

In the above technical solution, the liquid outlet surface is farther away from the electrode assembly than the abutting surface in the thickness direction of the end cap, so that there is a distance between the liquid outlet surface and the electrode assembly, which is convenient for the electrolyte solution to enter the first concave part from the liquid injection hole, facilitating the immersion of the electrolyte solution into the electrode assembly and facilitates the lateral flowing of the electrolyte solution.

In some embodiments, in the thickness direction of the end cap, the flow guiding channel, as a whole, is closer to the electrode assembly than the liquid outlet surface.

In the above technical solution, the flow guiding channel as a whole is closer to the electrode assembly than the liquid outlet surface in the thickness direction of the end cap, so that there is a larger distance between the liquid outlet surface and the electrode assembly, and the electrolyte solution is more likely to enter the flow guiding channel.

In some embodiments, the end cap further comprises: a second convex part located in the first concave part and protruding from the bottom surface of the first concave part towards the electrode assembly, and the liquid outlet surface is formed on one end of the second convex part facing the electrode assembly.

In the above technical solution, the second convex part located in the first concave part can strengthen the position of the end cap at which the liquid injection hole is provided, and improve the strength of the position of the end cap at which the liquid injection hole is provided.

In some embodiments, the flow guiding channel is a flow guiding groove disposed at one end of the first convex part away from the cap body.

In the above technical solution, the flow guiding channel is a flow guiding disposed at one end of the first convex part away from the cap body, so as to facilitate the formation of the flow guiding channel. In addition, since the side of the flow guiding groove facing the electrode assembly is open, a part of the electrolyte solution, when flowing in the flow guiding channel, can flow directly towards the inside of the electrode assembly, thereby improving the infiltration effect of the electrode assembly.

In some embodiments, the first convex part is provided with a plurality of the flow guiding channels circumferentially arranged at intervals with the liquid injection hole as a center.

In the above technical solution, the first convex part is provided with a plurality of flow guiding channels circumferentially arranged at intervals with the liquid injection hole as a center, and the electrolyte solution can flow in a plurality of different directions through the plurality of flow guiding channels, which further improves the liquid injection efficiency.

In some embodiments, the flow guiding channel extends along a radial direction of the liquid injection hole.

In the above technical solution, the flow guiding channel extends along the radial direction of the liquid injection hole, which facilitates the electrolyte solution to enter the flow guiding channel and improves the liquid injection efficiency.

In some embodiments, the liquid injection hole and the first convex part are coaxially arranged.

In some embodiments, the electrode assembly has a central hole, and in the thickness direction of the end cap, the central hole and the liquid injection hole are disposed opposite to each other.

In the above technical solution, in the thickness direction of the end cap, the central hole and the liquid injection hole are arranged opposite to each other. During the process of injecting electrolyte solution into the battery cell through the liquid injection hole, the electrolyte solution having entered the liquid injection hole can quickly enter the central hole to infiltrate the electrode sheets in the electrode assembly.

In a second aspect, an embodiment of the present application provides a battery, comprising: the battery cell provided by any one of the embodiments of the first aspect; and a box for accommodating the battery cell.

In a third aspect, an embodiment of the present application provides an electrical device, comprising the battery provided by any one of the embodiments of the second aspect.

In a fourth aspect, an embodiment of the present application provides a method for manufacturing a battery cell, the method comprising: providing an electrode assembly having a first tab; providing a housing having an opening; providing an end cap; making the electrode assembly accommodated in the housing; and making the end cap cover the opening, wherein the end cap comprises a cap body and a first convex part, the cap body is configured for connecting with the housing and covering the opening, and the first convex part protrudes from an inner surface of the cap body towards the electrode assembly, and the first convex part is configured to abut against the first tab; the end cap is provided with a liquid injection hole, and the liquid injection hole is configured for allowing the electrolyte solution to enter an interior of the battery cell from outside of the battery cell, and the liquid injection hole is located inside of an outer peripheral surface of the first convex part; the first convex part is provided with a flow guiding channel, and the flow guiding channel is communicated with the liquid injection hole and passes through the outer peripheral surface, the flow guiding channel is configured for allowing the electrolyte solution having entered the liquid injection hole to flow to outside of the outer peripheral surface.

In a fifth aspect, an embodiment of the present application further provides a device for manufacturing a battery cell, the manufacturing device comprising: a first providing device, configured for providing an electrode assembly, the electrode assembly having a first tab; a second providing device, configured for providing a housing having an opening; a third providing device, configured for providing an end cap; and an assembling device, configured for making the electrode assembly accommodated in the housing, and for making the end cap cover the opening, wherein the end cap comprises a cap body and a first convex part, the cap body is configured for connecting with the housing and covering the opening, and the first convex part protrudes from an inner surface of the cap body towards the electrode assembly, and the first convex part is configured to abut against the first tab; the end cap is provided with a liquid injection hole, and the liquid injection hole is configured for allowing electrolyte solution to flow from outside of the battery cell to an interior of the battery cell, and the liquid injection hole is located inside of an outer peripheral surface of the first convex part; the first convex part is provided with a flow guiding channel, and the flow guiding channel is communicated with the liquid injection hole and passes through the outer peripheral surface, and the flow guiding channel is configured for allowing the electrolyte solution having entered the liquid injection hole to flow to outside of the outer peripheral surface.

BRIEF DESCRIPTION OF DRAWINGS

In order to illustrate the technical solutions of the embodiments of the present application more clearly, the drawings needed to be used in the embodiments will be briefly introduced below. It should be understood that the following drawings only show some embodiments of the present application, and therefore should be regarded as limitation on the scope. For those skilled in the art, other related drawings can also be obtained according to these drawings without any creative effort.

Figure 1:
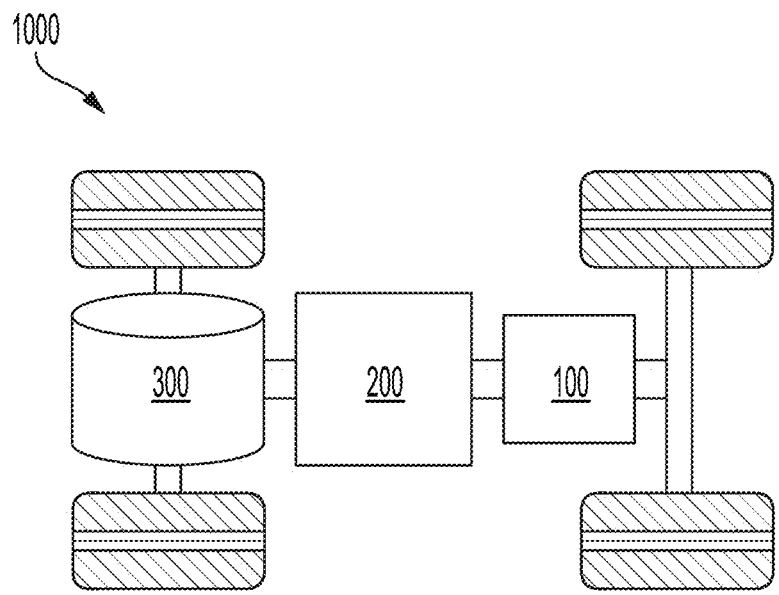
FIG. 1 is a schematic structural diagram of a vehicle provided by some embodiments of the present application.

Reference Numbers: 100—battery; 10—box; 11—first part; 12—second part; 13—accommodating space; 20—battery cell; 21—electrode assembly; 211—first tab; 212—main body part; 213—second tab; 214—central hole; 22—housing; 221—end wall; 222—peripheral wall; 225—roller groove; 23—end cap; 231—cap body; 232—first convex part; 2321—abutting surface; 233—liquid injection hole; 234—flow guiding channel; 235—first concave part; 236—liquid outlet surface; 237—second convex part; 238—third convex part; 239—second concave part; 24—blocking member; 25—insulation member, 251—first connection part; 252—second connection part; 253—third connection part; 254—fourth connection part; 200—controller; 300—motor; 1000—vehicle; 2000—manufacturing device; 2100—first providing device; 2200—second providing device; 2300—third providing device; 2400—assembling device; Z-thickness direction.

DETAILED DESCRIPTION OF EMBODIMENTS

In order to make the purposes, technical solutions and advantages of the embodiments of the present application more clear, the technical solutions in the embodiments of the present application will be clearly described below with reference to the drawings in the embodiments of the present application. Obviously, some, but not all, of embodiments are described. Based on the embodiments in the present application, all other embodiments, which are obtained by those skilled in the art without creative works, fall within the protection scope of the present application.

Unless defined otherwise, all technical and scientific terms used in the present application have the same meaning as commonly understood by those skilled in the technical field of the present application. The terms used in the present application in the specification of the present application are only for the purpose of describing specific embodiments, not intended to limit the present application. The terms "comprising" and "having" and any variations thereof in the description and claims of the present application and the above drawing description are intended to cover non-exclusive inclusion. The terms "first", "second" and the like in the description and claims of the present application or the above drawings are used to distinguish different objects, rather than to describe a specific order or a primary and secondary relationship.

The "embodiment" mentioned in the present application means that a particular feature, structure, or characteristic, which is described in connection with the embodiments, can be included in at least one embodiment of the present application. The appearances of the term in various places in the specification do not necessarily refer to a same embodiment, or a separate or alternative embodiment that is mutually exclusive of other embodiments.

In the description of the present application, it should be noted that, unless expressly specified and limited otherwise, the terms, "installed", "connected with", "connected to" and "attached" should be understood in a broad sense. For example, it may be a fixed connection, or a detachable connection, or an integral connection. It can be directly connected, or indirectly connected through an intermediate medium, and it can be internally communicated between two components. For those skilled in the art, the specific meanings of the above terms in the present application can be understood according to specific situations.

The term "and/or" in the present application is only an association relationship to describe associated objects, which means that there can be three kinds of relationships, for example, A and/or B can mean three cases, i.e., A exists alone, A and B exist at the same time, and B exists alone. In addition, the character "/" in the present application generally indicates that the related objects, which are before and after it, are in an "or" relationship.

In the embodiments of the present application, the same reference numeral denotes the same components. For the sake of brevity, detailed descriptions for the same components are omitted in different embodiments. It should be understood that the thickness, length, width and other dimensions of various components in the embodiments of the present application, as well as the overall thickness, length, width, and other dimensions of the integrated device are shown in the drawings, which are only exemplary descriptions, and should not constitute any limitation on the present application.

The appearance of "plurality" in the present application refers to two or more (including two).

In the present application, the battery cells may comprise lithium-ion secondary batteries, lithium-ion primary batteries, lithium-sulfur batteries, sodium-lithium-ion batteries, sodium-ion batteries, or magnesium-ion batteries, etc., which are not limited in the embodiments of the present application. The battery cell may be in the form of a cylinder, a flat body, a cuboid, or other shapes, which are not limited in the embodiments of the present application. The battery cells are generally divided into three types according to the packaging method: cylindrical battery cells, square battery cells, and soft-pack battery cells, which are not limited in the embodiments of the present application.

The battery mentioned in the embodiments of the present application refers to a single physical module including one or more battery cells to provide higher voltage and capacity. For example, the battery mentioned in the present application may comprise a battery module or a battery pack, and the like. The battery typically comprises a box for enclosing one or more battery cells. The box can prevent liquids or other foreign objects from affecting the charging or discharging of the battery cells.

The battery cell comprises an electrode assembly and electrolyte solution. The electrode assembly is composed of a positive electrode sheet, a negative electrode sheet and a separator. The battery cell works mainly relying on the movement of metal ions between the positive electrode sheet and the negative electrode sheet. The positive electrode sheet comprises a positive electrode current collector and a positive electrode active material layer, the positive electrode active material layer is coated on the surface of the positive electrode current collector, and the positive electrode current collector not coated with the positive electrode active material layer protrudes from the positive electrode current collector coated with the positive electrode active material layer. The positive electrode current collector not coated with the positive electrode active material layer is used as the positive electrode tab. With a lithium-ion battery as an example, the material of the positive electrode current collector can be aluminum, and the positive electrode active material can be lithium cobalt oxide, lithium iron phosphate, ternary lithium, or lithium manganate, etc. The negative electrode sheet comprises a negative electrode current collector and a negative electrode active material layer, the negative electrode active material layer is coated on the surface of the negative electrode current collector, and the negative electrode current collector not coated with the negative electrode active material layer is protruded from the negative electrode current collector that has been coated with the negative electrode active material layer. The negative electrode current collector not coated with the negative electrode active material layer is used as the negative electrode tab. The material of the negative electrode current collector can be copper, and the negative electrode active material can be carbon or silicon, etc. In order to ensure that large current is passed without fusing, the number of positive electrode tabs is plural and stacked together, and the number of negative electrode tabs is plural and stacked together. The material of the separator can be PP (polypropylene) or PE (polyethylene), and the like. In addition, the electrode assembly may be of a wound structure or a laminated structure, which is not limited in the embodiment of the present application.

For a common battery cell, it is relatively difficult to inject electrolyte solution into the battery cell through the liquid injection hole, and the injection efficiency is low.

The inventor found that, in the battery cell, in the case that the end cap is electrically connected to the tab of the electrode assembly, the inner surface of the end cap abuts against the tab, and during the process of injecting electrolyte solution into the battery cell through the liquid injection hole on the end cap, it is difficult for the electrolyte solution to flow laterally between the inner surface of the end cap and the tab, resulting in a problem of low injection efficiency.

In view of this, an embodiment of the present application provides a technical solution. The end cap of the battery cell comprises a cap body and a first convex part. The first convex part protrudes from the inner surface of the cap body towards the electrode assembly and abuts against the first tab. The first convex part is provided with a flow guiding channel, and the flow guiding channel communicates with the liquid injection hole on the end cap and penetrates the outer peripheral surface of the first convex part, so that the electrolyte solution can flow laterally to the outside of the outer peripheral surface of the first convex part through the flow guiding channel, thereby improving the injection efficiency.

The technical solutions described in the embodiments of the present application are applicable to battery cells, batteries, and electrical device using batteries.

Electrical devices can be vehicles, mobile phones, portable devices, notebook computers, ships, spacecraft, electric toys and power tools, and so on. The vehicles can be fuel vehicles, gas vehicles or new energy vehicles, and the new energy vehicles can be pure electric vehicles, hybrid vehicles or extended-range vehicles, etc. The spacecraft includes airplanes, rockets, space shuttles, spacecraft, etc. The electric toys include the fixed or mobile electric toys, such as, game consoles, electric car toys, electric ship toys, electric airplane toys, etc. The electric tools include metal cutting power tools, grinding power tools, assembling power tools and railway power tools, such as, electric drills, electric grinders, electric wrenches, electric screwdrivers, electric hammers, electric impact drills, concrete vibrators and electric planers, etc. and the embodiments of the present application do not impose special limitation on the above-mentioned electrical devices.

In the following embodiments, for the convenience of description, the description is made with the example in which the electric device is a vehicle.

Referring to FIG. 1, it is a schematic structural diagram of the vehicle 1000 provided by some embodiments of the present application. A battery 100 is disposed inside the vehicle 1000, and the battery 100 may be disposed at the bottom, head or tail of the vehicle 1000. The battery 100 may be used for supplying power to the vehicle 1000, and for example, the battery 100 may be used as an operating power source of the vehicle 1000.

The vehicle 1000 may also include a controller 200 and a motor 300, with the controller 200 used for controlling the battery 100 to supply power to the motor 300, e.g., for the work power requirements during starting, navigating, and driving the vehicle 1000.

In some embodiments of the present application, the battery 100 can be used as not only the operating power source of the vehicle 1000, but also the driving power source of the vehicle 1000, to replace or partially replace the fuel or natural gas to provide the driving power for the vehicle 1000.

Figure 2:
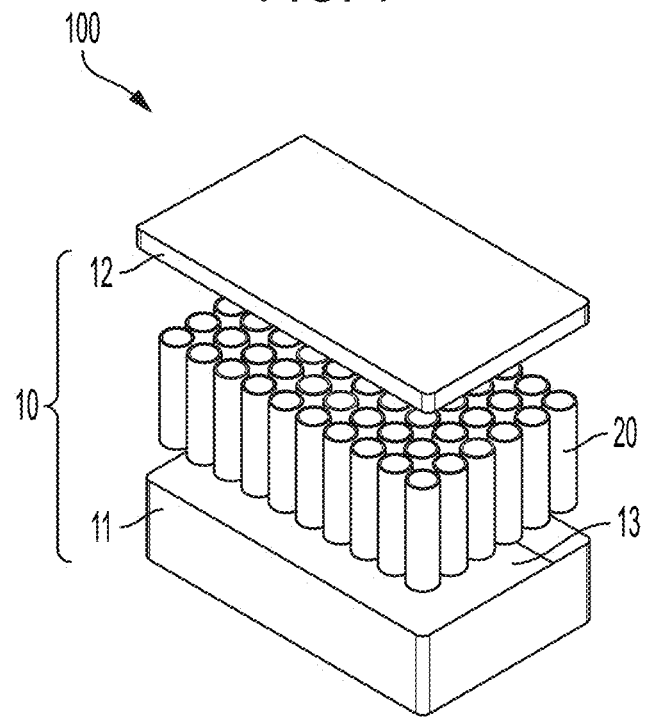
FIG. 2 is a schematic structural diagram of a battery provided by some embodiments of the present application.

In some embodiments, referring to FIG. 2, it is a schematic structural diagram of a battery 100 provided by some embodiments of the present application. The battery 100 comprises a box 10 and a battery cell 20, and the box 10 is used to accommodate the battery cell 20.

The box 10 may include a first part 11 and a second part 12, and the first part 11 and the second part 12 are covered with each other to define an accommodating space 13 for accommodating the battery cells 20. The first part 11 and the second part 12 may be of various shapes, such as, a cuboid, a cylinder, and the like. The first part 11 can be a hollow structure with one side open, and the second part 12 can be a hollow structure with one side open as well. The open side of the second part 12 covers the open side of the first part 11 to form a box 10 with an accommodating cavity. As shown in FIG. 2, it is also possible that the first part 11 is a hollow structure with one side open, the second part 12 is a plate-like structure, and the second part 12 covers the open side of the first part 11 to form a box 10 with an accommodating cavity. Exemplarily, in FIG. 2, the first part 11 and the second part 12 are both of the cuboid structure.

Herein, the first part 11 and the second part 12 can be sealed by a sealing element or sealer, and the sealing element can be a sealing ring, a sealant or the like.

In the battery 100, there may be one or plural battery cells 20. If there are plural battery cells 20, the plural battery cells 20 may be connected in series or in parallel or in a mixed connection. The mixed connection means that the plurality of battery cells 20 have some connected in series and the remaining in parallel. It is possible that the plurality of battery cells 20 are connected in series or in parallel or in mixed connection, to form a battery module, and then the plurality of battery modules may be connected in series or in parallel or in mixed connection to form a whole, which is accommodated in the box 10. It is also possible that all the battery cells 20 are directly connected in series, in parallel or in a mixed connection, and then the whole formed by all the battery cells 20 is accommodated in the box 10.

In some embodiments, the battery 100 may further include a bus component, and the plurality of battery cells 20 may be electrically connected through the bus component, so as to realize the series, parallel or mixed connection of the plurality of battery cells 20.

The bus component may be a metal conductor, such as copper, iron, aluminum, stainless steel, aluminum alloys, and the like.

Figure 3:
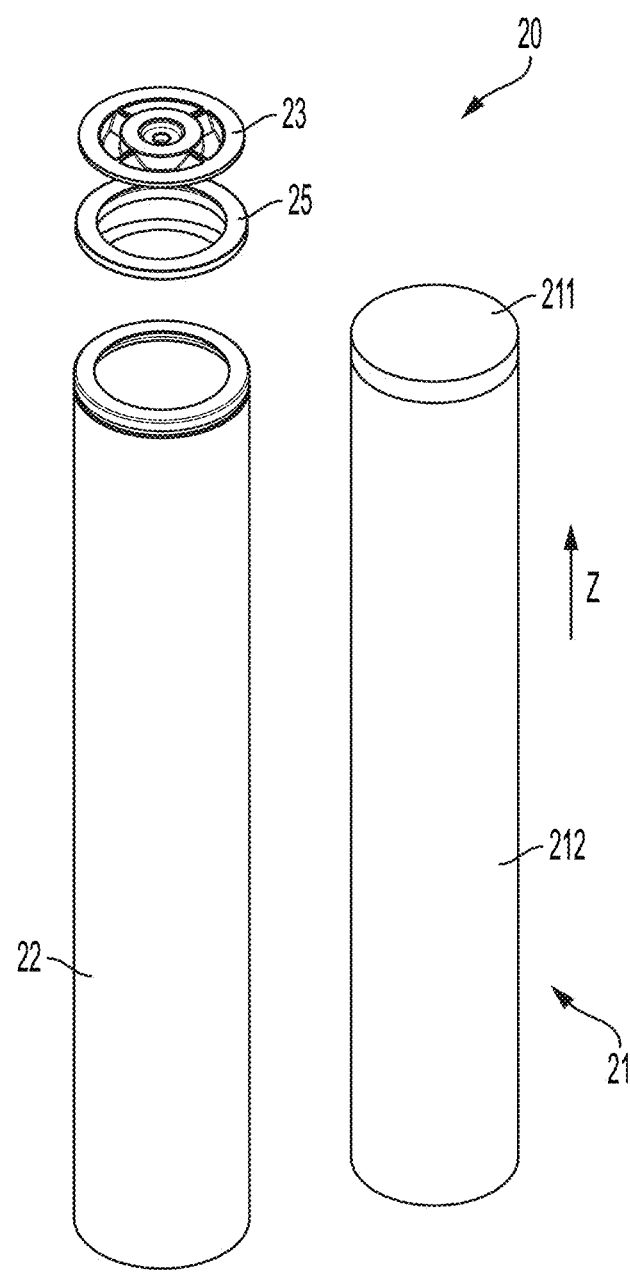
FIG. 3 is an exploded view of a battery cell provided by some embodiments of the present application.
Figure 4:
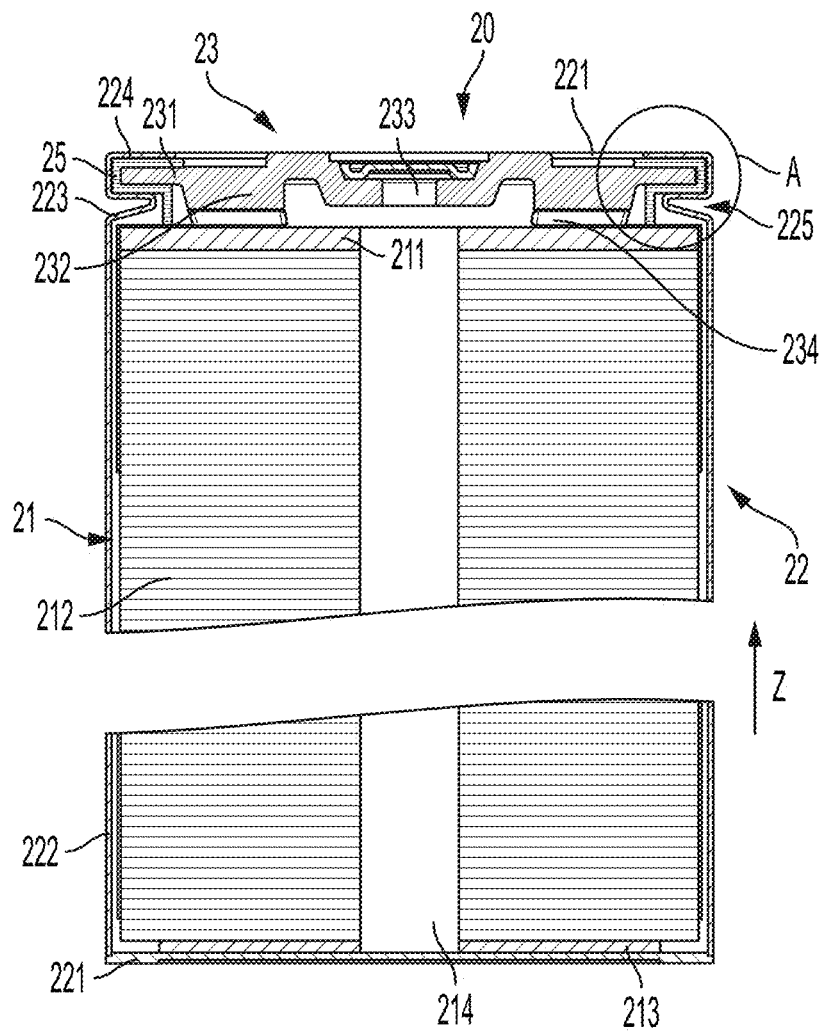
FIG. 4 is a sectional view of the battery cell shown in FIG. 3.

Referring to FIGS. 3 and 4, FIG. 3 is an exploded view of a battery cell 20 provided by some embodiments of the present application, and FIG. 4 is a sectional view of the battery cell 20 shown in FIG. 3. The battery cell 20 comprises an electrode assembly 21, a housing 22 and an end cap 23. The electrode assembly 21 has a first tab 211, the housing 22 has an opening, the housing 22 is used to accommodate the electrode assembly 21, and the end cap 23 is used to be connected and cover the opening of the housing 22.

Here, the end cap 23 comprises a cap body 231 and a first convex part 232, the cap body 231 is used to connect with the housing 22 and cover the opening, and the first convex part 232 protrudes from the inner surface of the cap body 231 towards the electrode assembly 21 and abuts against the first tab 211. The end cap 23 is provided with a liquid injection hole 233. The liquid injection hole 233 is used for allowing the electrolyte solution to enter the battery cell 20 from the outside of the battery cell 20. The liquid injection hole 233 is located inside of the outer peripheral surface of the first convex part 232. The first convex part 232 is provided with a flow guiding channel 234, the flow guiding channel 234 communicates with the liquid injection hole 233 and penetrates the outer peripheral surface of the first convex part 232, and the flow guiding channel 234 is used for allowing at least part of the electrolyte solution to flow to outside of the outer peripheral surface of the first convex part 232.

Since the first convex part 232 is provided with a flow guiding channel 234, the flow guiding channel 234 communicates with the liquid injection hole 233 and penetrates the outer peripheral surface of the first convex part 232. During the process of injecting the electrolyte solution into the battery cell 20 through the liquid injection hole 233, the electrolyte solution can flow laterally to outside of the outer peripheral surface of the first convex part 232 through the flow guiding channel 234, so that the electrolyte solution can quickly flow to the outer periphery of the electrode assembly 21, improving the smoothness of flowing of the electrolyte solution, which can effectively increase the injection efficiency and enable the electrolyte solution to fully infiltrate the electrode assembly 21. For the battery cell 20 with the above structure, the liquid injection can be realized without excessive liquid injection pressure, which can effectively reduce the damage of the separator in the electrode assembly 21 due to the excessive liquid injection pressure, which may cause the risk that the positive electrode sheet and the negative electrode sheet are directly contacted to result in the short circuit.

The first convex part 232 of the end cap 23 abuts against the first tab 211, so that the electrical connection between the end cap 23 and the first tab 211 can be achieved. In order to ensure good contact between the first tab 211 and the end cap 23, the first convex part 232 of the end cap 23 can be fixed to the first tab 211, and for example, the first convex part 232 and the first tab 211 are welded together.

It should be noted that the liquid injection hole 233 is located inside of the outer peripheral surface of the first convex part 232, that is, the outer peripheral surface of the first convex part 232 is located at the outer periphery of the liquid injection hole 233. The liquid injection hole 233 may be located at the central position of the first convex part 232, or the liquid injection hole 233 may be offset from the central position of the first convex part 232. Exemplarily, the liquid injection hole 233 is disposed coaxially with the first convex part 232, that is, the axis of the liquid injection hole 233 coincides with the axis of the outer peripheral surface of the first convex part 232, so that the liquid injection hole 233 is located on the central position of the first convex part 232.

In some embodiments, the electrode assembly 21 may further include a main body part 212 and a second tab 213. Both the first tab 211 and the second tab 213 protrude from the main body part 212, and the first tab 211 and the second tab 213 have polarities opposite to each other. If the first tab 211 is a positive electrode tab, the second tab 213 is a negative electrode tab; and if the first tab 211 is a negative electrode tab, the second tab 213 is a positive electrode tab. The first tab 211 is used for being electrically connected with the end cap 23, and the second tab 213 is used for being electrically connected with the housing 22.

Exemplarily, the first tab 211 and the second tab 213 respectively protrude from two ends of the main body part 212 which are opposite in the thickness direction Z of the end cap 23.

The main body part 212 may include a positive electrode sheet, a negative electrode sheet and a separator. The main body part 212 may be a wound structure, which is formed by winding the positive electrode sheet, the separator and the negative electrode sheet. The main body part 212 may also be a stacked structure, which is formed by stacking the positive electrode tab, the separator and the negative electrode tab.

The positive electrode sheet comprises a positive electrode current collector and positive electrode active material layers coated on two opposite sides of the positive electrode current collector. The negative electrode sheet comprises a negative electrode current collector and negative electrode active material layers coated on two opposite sides of the negative electrode current collector. The main body part 212 may be the portion of the electrode assembly 21 corresponding to the region of the electrode sheet that is coated with the active material layer, and the tab may be the portion of the electrode assembly 21 corresponding to the region of the electrode sheet that is not coated with the active material layer. It is understandable that the positive electrode tab may be the area on the positive electrode sheet that is not coated with the positive active material layer, and the negative electrode tab may be the area on the negative electrode sheet that is not coated with the negative electrode active material layer.

In the embodiment of the present application, the housing 22 is used to accommodate the electrode assembly 21, and the housing 22 may be in various shapes, such as, a cylinder, a cuboid, and the like. The shape of the housing 22 may be determined according to the specific shape of the electrode assembly 21. For example, if the electrode assembly 21 is of a cylindrical structure, the housing 22 can be of a cylindrical structure; and if the electrode assembly 21 is of a cuboid structure, the housing 22 can be of a cuboid structure. Exemplarily, in FIGS. 3 and 4, the housing 22 is of a hollow cylindrical structure.

The housing 22 may be made of metal material, such as, copper, iron, aluminum, steel, aluminum alloy, and the like.

In some embodiments, the housing 22 may include an end wall 221 and a peripheral wall 222 surrounding the edge of the end wall 221, the end wall 221 is located at one end of the peripheral wall 222, the other end of the peripheral wall 222 forms an opening, and the end cap 23 is used for connecting with the peripheral wall 222 and covers the opening to form a sealed space for accommodating the electrode assembly 21 and the electrolyte solution.

Exemplarily, the second tab 213 is welded to the end wall 221 of the housing 22 to realize the electrical connection between the second tab 213 and the housing 22.

It should be noted that, the end wall 221 and the peripheral wall 222 may be an integrally-formed structure or a separate structure. If the end wall 221 and the peripheral wall 222 are of a separate structure, the housing 22 is formed by assembling the two together.

In some embodiments, a first limit part 223 and a second limit part 224 are formed on the peripheral wall 222 of the housing 22. The first limit part 223 is located on the side of the cap body 231 facing the electrode assembly 21, and the second limit part 223 is located on the side of the cap body 231 away the electrode assembly 21. In the thickness direction Z of the end cap 23, the first limit part 223 is used to limit the cap body 231 from moving relative to the housing 22 towards the electrode assembly 21, so as to reduce the risk that the end cap 23 is forced to press the electrode assembly 21 to cause the damage to the electrode assembly 21. The second limit part 224 is used to limit the movement of the cap body 231 relative to the housing 22 in the direction away from the electrode assembly 21 so as to limit the end cap 23 from being detached from the housing 22. That is to say, the first limit part 223 and the second limit part 224 function to cooperate with each other, for limiting the movement of the cap body 231 relative to the housing 22 along the thickness direction Z of the end cap 23.

Both the first limit part 223 and the second limit part 224 may be of an annular structure.

Exemplarily, the peripheral wall 222 of the housing 22 is provided with a roller groove 225 which is recessed inward toward the outer peripheral surface of the peripheral wall 222, and a first limit part 223 is formed on the inner peripheral surface of the peripheral wall 222 at a position corresponding to the roller groove 225, so that the housing 22 is provided with a necking structure at the position where the first limit part 223 is formed.

Exemplarily, the second limit part 224 is a flanging structure which is formed at the opening position by partially inward folding the peripheral wall 222 of the housing 22.

In the process of assembling the battery cell 20, the electrode assembly 21 can be accommodated in the housing 22 first, and then the end cap 23 covers the end of the peripheral wall 222 away from the end wall 221, and the end cap 23 cannot move to the inside of the housing 22 under the restriction of the first limit part 223, and finally, the peripheral wall 222 of the housing 22 is partially folded inward to form a second limit part 224 to fix the end cap 23.

In the embodiment of the present application, the flow guiding channel 234 is communicated with the liquid injection hole 233. It is possible that the flow guiding channel 234 is directly connected with the liquid injection hole 233. For example, one end of the flow guiding channel 234 directly penetrates the hole wall of the liquid injection hole 233. Of course, it is also possible that the flow guiding channel 234 is in indirect communication with the liquid injection hole 233.

Figure 5:
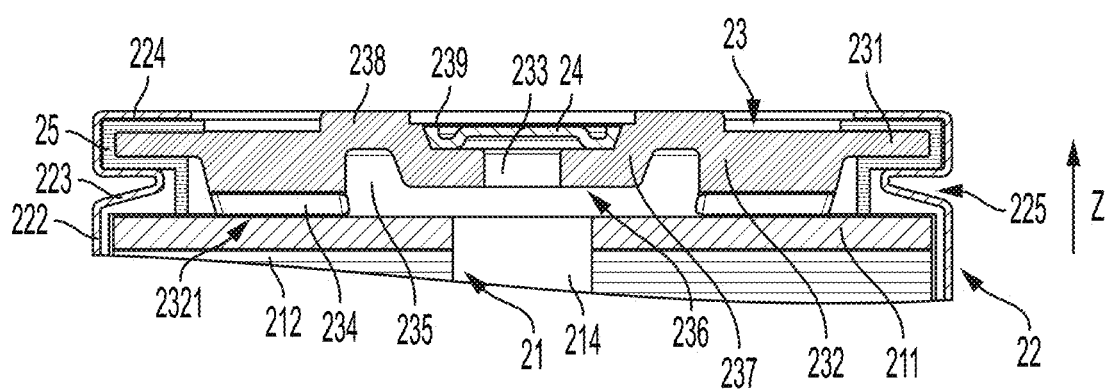
FIG. 5 is a partial view of the battery cell shown in FIG. 4.

In some embodiments, referring to FIG. 5, FIG. 5 is a partial sectional view of the battery cell 20 shown in FIG. 4. The flow guiding channel 234 is in indirect communication with the liquid injection hole 233. Specifically, an abutting surface 2321 is formed at one end of the first convex part 232 away from the cap body 231, and the abutting surface 2321 is used to abut against the first tab 211. The end cap 23 is provided with a first concave part 235 which is recessed from the abutting surface 2321 to the direction away from the electrode assembly 21, and the liquid injection hole 233 communicates with the flow guiding channel 234 through the first concave part 235. With such structure, it is enabled that after the electrolyte solution enters the first concave part 235 through the liquid injection hole 233, a part of the electrolyte solution can directly enter the inside of the electrode assembly 21 through the first concave part 235 to infiltrate the electrode sheet, and a part of the electrolyte solution can enter the flow guiding channel 234 through the first concave part 235 and finally flows outside of the outer peripheral surface of the first convex part 232, so as to improve the effect of the electrolyte solution infiltrating the electrode assembly 21 and increase the injection efficiency.

Exemplarily, the first concave part 235 is disposed coaxially with the liquid injection hole 233.

It should be noted that, the first concave part 235 may be fully located in the first convex part 232, or may be partially recessed into the cap body 231. If the first concave part 235 is fully located in the first convex part 232, in the thickness direction Z of the end cap 23, the distance from the bottom surface of the first concave part 235 to the abutting surface 2321 of the first convex part 232 is not greater than the distance from the inner surface of the cap body 231 to the abutting surface 2321 of the first convex part 232. As shown in FIG. 5, if a part of the first concave part 235 is recessed into the cap body 231, in the thickness direction Z of the end cap 23, the distance from the bottom surface of the first concave part 235 to the abutting surface 2321 of the first convex part 232 is greater than the distance from the inner surface of the cap body 231 to the abutting surface 2321 of the first convex part 232, which makes the first concave part 235 have deeper depth and capable of accommodating more electrolyte solution.

In some embodiments, the two ends of the flow guiding channel 234 penetrate through the outer peripheral surface of the first convex part 232 and the inner peripheral surface of the first concave part 235 respectively, which is beneficial for the electrolyte solution to enter the flow guiding channel 234 from the first concave part 235, so that the electrolyte solution can flow laterally to the outside of the outer peripheral surface of the first convex part 232.

The flow guiding channel 234 may extend along a straight line. The extending direction of the flow guiding channel 234 may be perpendicular to the axis of the liquid injection hole 233, that is, the flow guiding channel 234 extends along the radial direction of the liquid injection hole 233. The extending direction of the flow guiding channel 234 can also be arranged in the way that an acute angle is formed between it and the axis of the liquid injection hole 233. For example, in the thickness direction Z of the end cap 23, the end of the flow guiding channel 234 penetrating the outer peripheral surface of the first convex part 232 is closer to the electrode assembly 21 than the end of the channel 234 penetrating the inner peripheral surface of the first concave part 235. That is, one end of the flow guiding channel 234 penetrating the outer peripheral surface of the first convex part 232 is lower than one end of the flow guiding channel 234 penetrating the inner peripheral surface of the first concave part 235, so that the flow guiding channel 234 is in an inclined state, which is favorable for the electrolyte solution to flow within the flow guiding channel 234. In FIG. 5, the flow guiding channel 234 extends along the radial direction of the liquid injection hole 233.

In other embodiments, both ends of the flow guiding channel 234 penetrate through the outer peripheral surface of the first convex part 232 and the bottom surface of the first concave part 235 respectively. In this embodiment, the flow guiding channel 234 may be a bent channel formed inside the end cap 23.

In some embodiments, continuously referring to FIG. 5, the end cap 23 has a liquid outlet surface 236, one end of the liquid injection hole 233 penetrates the liquid outlet surface 236, and the liquid outlet surface 236 is located in the first concave part 235. In the thickness direction Z of the end cap 23, the liquid outlet surface 236 is farther away from the electrode assembly 21 than the abutting surface 2321, so that there is a distance between the liquid outlet surface 236 and the electrode assembly 21, which is convenient for the electrolyte solution to enter to the first concave part 235 from the liquid injection hole 233, which is favorable for the electrolyte solution to infuse the electrode assembly 21 and facilitates the lateral flowing of the electrolyte solution.

Optionally, in the thickness direction Z of the end cap 23, the flow guiding channel 234, as a whole, is closer to the electrode assembly 21 than the liquid outlet surface 236, so that there is a larger distance between the liquid outlet surface 236 and the electrode assembly 21, and the electrolyte solution is easier to enter the flow guiding channel 234.

Optionally, the end cap 23 may further include a second convex part 237, the second convex part 237 is located in the first concave part 235 and protrudes from the bottom surface of the first concave part 235 towards the electrode assembly 21, and the liquid outlet surface 236 is formed on one end of the second convex part 237 facing the electrode assembly 21. The second convex part 237 can strengthen the position of the end cap 23 at which the liquid injection hole 233 is arranged, and improve the strength of the position of the end cap 23 at which the liquid injection hole 233 is arranged.

In some embodiments, the electrode assembly 21 has a central hole 214. In the thickness direction Z of the end cap 23, the central hole 214 is provided as opposite to the liquid injection hole 233. During the process that the electrolyte solution is injected into the battery cell 20 through the liquid injection hole 233, the electrolyte solution which has entered the liquid injection hole 233 can quickly flow into the central hole 214 to infiltrate the electrode sheets in the electrode assembly 21.

It should be noted that, in the thickness direction Z of the end cap 23, the central hole 214 is disposed opposite the liquid injection hole 233, that is, in the thickness direction Z of the end cap 23, the projection of the hole wall of the liquid injection hole 233 is at least partially located in the central hole 214.

Exemplarily, the central hole 214 is provided coaxially with the liquid injection hole 233, and the diameter of the liquid injection hole 233 is smaller than that of the central hole 214, so that the projection of the hole wall of the liquid injection hole 233 on the thickness direction Z of the end cap 23 is fully located in the central hole 214, and thus the electrolyte solution can more easily enter the central hole 214 from the liquid injection hole 233 to infiltrate the electrode sheet.

In some embodiments, the end cap 23 may further include a third convex part 238. The third convex part 238 protrudes from the outer surface of the cap body 231 in a direction away from the electrode assembly 21. In the thickness direction Z of the end cap 23, the projection of the third convex part 238 completely covers the first concave part 235. The third convex part 238 can strengthen the position of the end cap 23 at which the first concave part 235 is provided, so as to improve the strength of the position of the end cap 23 at which the first concave part 235 is provided.

Exemplarily, the third convex part 238 is of a cylindrical structure.

In some embodiments, the second limit part 224 of the housing 22 is located on the outer periphery of the third convex part 238, that is, the third convex part 238 is located inside of the inner peripheral surface of the second limit part 224, and the second limit part 224 and the third convex part 238 serve as two output poles of the battery cell 20 respectively. The output pole is a portion of the battery cell 20 which is connected to other components and outputs the electrical energy. It is possible that the second limit part 224 is used as the positive output pole of the battery cell 20, and the third convex part 238 is used as the negative output pole of the battery cell 20. It is also possible that the second limit part 224 is used as the negative output pole of the battery cell 20 and the third convex part 238 serves as the positive output pole of the battery cell 20. With an example in which the two battery cells 20 are electrically connected through the bus component to realize the series connection of the two battery cells 20, the second limit part 224 of one battery cell 20 and the third convex part 238 of another battery cell 20 are both connected to the same bus component, e.g., by welding.

Optionally, the outer surface of the second limit part 224 (the surface of the second limit part 224, which is away from the cap body 231 in the thickness direction Z of the end cap 23) is flush with the outer surface of the third convex part 238 (the surface of the third convex part 238, which is away from the cap body 231 in the thickness direction Z of the end cap 23), so that the second limit part 224 and the third convex part 238 are connected to the bus component.

In some embodiments, the battery cell 20 further comprises a blocking member 24, and the blocking member 24 is used to block the liquid injection hole 233. The end cap 23 is provided with a second concave part 239. The second concave part 239 is recessed from the outer surface of the third convex part 238 towards the electrode assembly 21. The second concave part 239 is used to accommodate the blocking member 24 to hide the blocking member 24. The blocking member 24 is unlikely to affect the connection between the third convex part 238 and the bus component.

Exemplarily, both ends of the liquid injection hole 233 penetrate through the liquid outlet surface 236 and the bottom surface of the second concave part 239 respectively.

Figure 6:
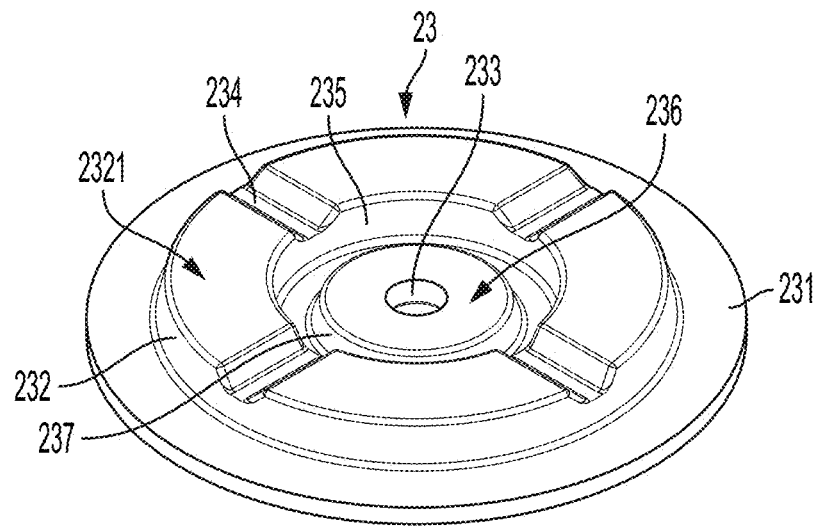
FIG. 6 is the structural schematic diagram of the end cap shown in FIG. 5.

In some embodiments, referring to FIG. 6, FIG. 6 is a schematic structural diagram of the end cap 23 shown in FIG. 5. The flow guiding channel 234 is a flow guiding groove disposed at one end of the first convex part 232 away from the cap body 231 to facilitate the forming of the flow guiding channel 234. In the actual production process, the flow guiding groove can be directly formed, by processing, on the abutting surface 2321.

In addition, since the side of the flow guiding groove facing the electrode assembly 21 is open, a part of the electrolyte solution, when flowing within the flow guiding channel 234, can flow directly towards the inside of the electrode assembly 21, which is convenient for the electrolyte solution to enter the electrode assembly 21 and infiltrate the electrode sheet, which can effectively improve the infiltration effect on the electrode assembly 21.

Exemplarily, the flow guiding groove is disposed on the abutting surface 2321 of the first convex part 232.

In some embodiments, the flow guiding channel 234 extends along the radial direction of the liquid injection hole 233, so that the electrolyte solution can easily enter the flow guiding channel 234, which improves the injection efficiency.

As an example in which the first concave part 235 is formed on the end cap 23, the two ends of the flow guiding channel 234 in the radial direction of the liquid injection hole 233 respectively penetrate the outer peripheral surface of the first convex part 232 and the inner peripheral surface of the first concave part 235.

In the embodiment of the present application, there may be one or more flow guiding channels 234 on the first convex part 232.

In some embodiments, continuously referring to FIG. 6, the first convex part 232 is provided with a plurality of flow guiding channels 234, which are circumferentially arranged at intervals with the liquid injection hole 233 as the center, so that the electrolyte solution can flow in plural different directions through the plurality of flow guiding channels 234, so as to further increase the injection efficiency.

Exemplarily, in FIG. 6, the first convex part 232 is provided with four flow guiding channels 234, which are circumferentially arranged at intervals with the liquid injection hole 233 as the center, wherein the included angle between every two adjacent flow guiding channels 234 is 90 degrees.

Figure 7:
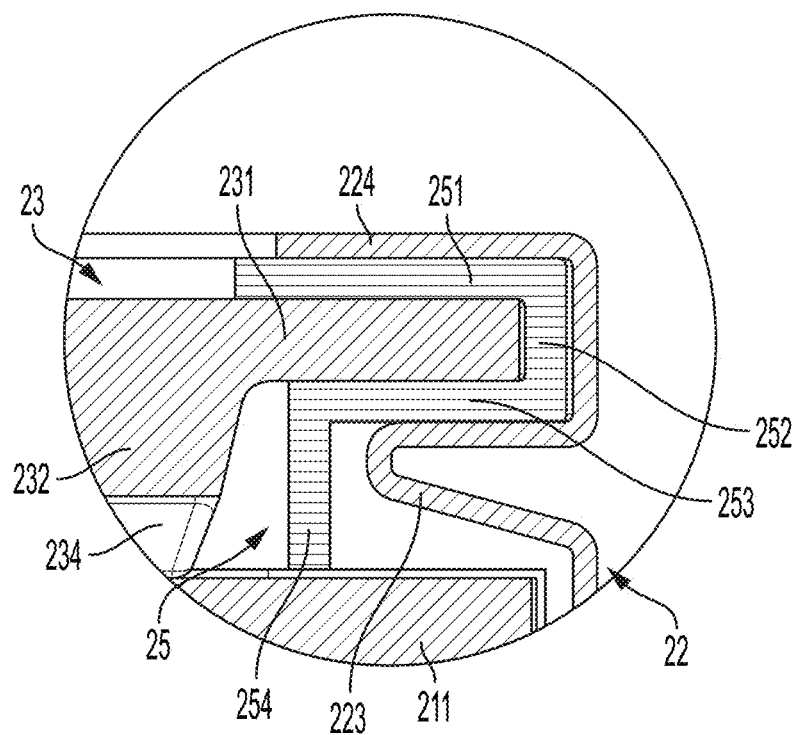
FIG. 7 is a partial enlarged view of the battery cell shown in FIG. 4.

In some embodiments, referring to FIG. 7, which is a partial enlarged view of the battery cell 20 shown in FIG. 4. The battery cell 20 may further include an insulating member or insulator 25 for isolating the end cap 23 from the housing 22, for realizing the insulating connection between the end cap 23 and the housing 22, so as to reduce the risk of short circuit caused by the contact between the end cap 23 and the housing 22.

The insulating member 25 may be an insulating material, such as, plastic, rubber, or the like.

Exemplarily, the insulating member 25 is disposed between the peripheral wall 222 of the housing 22 and the cap body 231 of the end cap 23 to separate the cap body 231 from the peripheral wall 222 of the housing 22 to achieve the insulating connection between the end cap 23 and the housing 22.

It should be noted that the insulating member 25 between the end cap 23 and the housing 22 can only play an insulating role, or can also play a sealing role while playing an insulating role, so as to realize the sealing of the end cap 23 and the housing 22.

In some embodiments, the insulating member 25 comprises a first connection part 251, a second connection part 252, a third connection part 253 and a fourth connection part 254 which are connected in sequence. In the thickness direction Z of the end cap 23, the first connection part 251 and the third connection part 253 are located on both sides of the cap body 231 respectively. The cap body 231 presses the third connection part 253 against the first limit part 223, and the second limit part 224 presses the first connection part 251 against the cap body 231. The second connection part 252 is located between the outer peripheral surface of the cap body 231 and the inner peripheral surface of the housing 22. The fourth connection part 254 is located between the outer peripheral surface of the first convex part 232 and the inner peripheral surface of the first limit part 223. The fourth connection part 254 is used to separate the first convex part 232 and the first limit part 223, lowering the risk that the first convex part 232 is in contact with the first limit part 223 to cause a short circuit.

Herein, the first connection part 251, the second connection part 252, the third connection part 253 and the fourth connection part 254 may each be of an annular structure.

Figure 8:
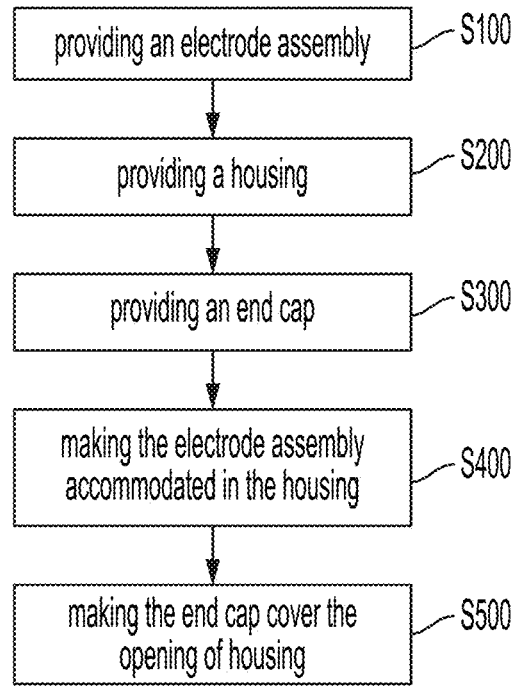
FIG. 8 is a flowchart of a method for manufacturing a battery cell provided by some embodiments of the present application.

The embodiment of the present application provides a method for manufacturing a battery cell 20. Referring to FIG. 8, FIG. 8 is a flowchart of a method for manufacturing the battery cell 20 provided by some embodiments of the present application. The manufacturing method comprises:

S100: providing an electrode assembly 21, the electrode assembly 21 having a first tab 211;
S200: providing a housing 22 having an opening;
S300: providing an end cap 23;
S400: making the electrode assembly 21 accommodated in the housing 22;
S500: making the end cap 23 cover the opening of the housing 22;

wherein the end cap 23 comprises a cap body 231 and a first convex part 232, the cap body 231 is used to connect with the housing 22 and cover the opening, and the first convex part 232 protrudes from the inner surface of the cap body 231 towards the electrode assembly 21. The first convex part 232 is used to abut against the first tab 211. The end cap 23 is provided thereon with a liquid injection hole 233. The liquid injection hole 233 is used for the electrolyte solution to enter the battery cell 20 from the outside of the battery cell 20. The liquid injection hole 233 is located inside the outer peripheral surface of the first convex part 232. The first convex part 232 is provided with a flow guiding channel 234, which communicates with the liquid injection hole 233 and penetrates the outer peripheral surface. The flow guiding channel 234 is used for allowing the electrolyte solution having entered the liquid injection hole 233 to flow to outside of the outer peripheral surface.

In the above method, the sequence of step S100, step S200 and step S300 is not limited. For example, it is possible that step S300 is performed first, then step S200 is performed, and then step S100 is performed.

It should be noted that, the related structure of the battery cell 20 manufactured by the manufacturing methods provided in the foregoing embodiments may be obtained by referring to the battery cell 20 provided in the foregoing embodiments, which is not described herein again.

Figure 9:
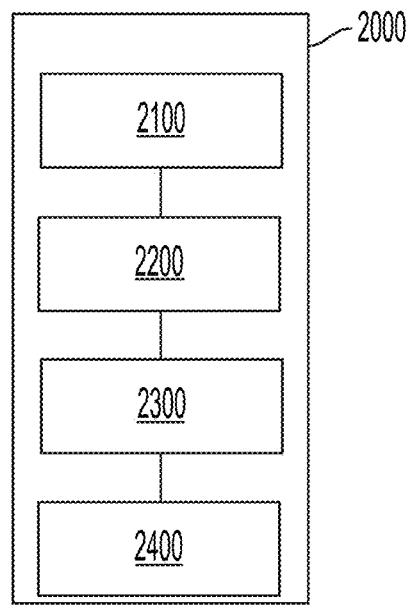
FIG. 9 is a schematic block diagram of a device for manufacturing a battery cell provided by some embodiments of the present application.

In addition, an embodiment of the present application further provides a manufacturing device 2000 for a battery cell 20. Referring to FIG. 9, FIG. 9 is a schematic block diagram of a manufacturing device 2000 for a battery cell 20 provided by some embodiments of the present application. The manufacturing device 2000 comprises a first providing device 2100, a second providing device 2200, a third providing device 2300 and an assembling device 2400.

Here, the first providing device 2100 is used for providing the electrode assembly 21, and the electrode assembly 21 has a first tab 211. The second providing device 2200 is used to provide the housing 22, which has an opening. The third providing device 2300 is used for providing the end cap 23. The assembling device 2400 is used for making the electrode assembly 21 accommodated in the housing 22. The assembly device 2400 is also used to make the end cap 23 cover the opening.

Here, the end cap 23 comprises a cap body 231 and a first convex part 232, the cap body 231 is used to connect with the housing 22 and cover the opening, and the first convex part 232 protrudes from the inner surface of the cap body 231 towards the electrode assembly 21, and the first convex part 232 is used to abut against the first tab 211. The end cap 23 is provided with a liquid injection hole 233. The liquid injection hole 233 is used for allowing the electrolyte solution to enter the battery cell 20 from the outside of the battery cell 20. The liquid injection hole 233 is located inside the outer peripheral surface of the first convex part 232. The first convex part 232 is provided with a flow guiding channel 234, which communicates with the liquid injection hole 233 and penetrates the outer peripheral surface. The flow guiding channel 234 is used for allowing the electrolyte solution having entered the liquid injection hole 233 to flow to outside of the outer peripheral surface.

It should be noted that, the related structure of the battery cell 20 manufactured by the manufacturing device 2000 provided in the foregoing embodiment may be obtained by referring to the battery cell 20 provided in the foregoing embodiments, which is not described herein again.

It should be noted that the embodiments in the present application and the features of the embodiments may be combined with each other in the case of no conflict.

The above embodiments are only used to illustrate the technical solutions of the present application, and not intended to limit the present application. For those skilled in the art, the present application may have various modifications and changes. Any modifications, equivalent replacements, improvements, etc., made within the spirit and principle of the present application, shall be covered by the protection scope of the present application.

What is claimed is:

1. A battery cell, comprising:
an electrode assembly, having a first tab;
a housing, having an opening, with the housing configured for accommodating the electrode assembly; and
an end cap, comprising a cap body and a first convex part, wherein the cap body is configured for connecting with the housing and covering the opening, the first convex part protrudes from an inner surface of the cap body towards the electrode assembly and abuts against the first tab; the end cap is provided with a liquid injection hole, and the liquid injection hole is configured for allowing electrolyte solution to enter an interior of the battery cell from outside of the battery cell, and the liquid injection hole is located inside of an outer peripheral surface of the first convex part,
wherein the first convex part is provided with a flow guiding channel, the flow guiding channel communicates with the liquid injection hole and penetrates the outer peripheral surface, and the flow guiding channel is configured for allowing at least part of the electrolyte solution to flow to outside of the outer peripheral surface, wherein
the first convex part is an annular convex structure formed by around the liquid injection hole;
one end of the first convex part away from the cap body is provided with an abutting surface, and the abutting surface is configured for abutting against the first tab; and
the end cap is provided with a first concave part which is recessed from the abutting surface in a direction away from the electrode assembly, and the liquid injection hole communicates with the flow guiding channel through the first concave part, wherein
the end cap is provided with a liquid outlet surface, and one end of the liquid injection hole penetrates through the outlet surface;
the end cap further comprises:
a second convex part, which is located in the first concave part and protrudes from a bottom surface of the first concave part towards the electrode assembly, and the liquid outlet surface is formed on one end of the second convex part facing the electrode assembly.

2. The battery cell according to claim 1, wherein both ends of the flow guiding channel penetrate through the outer peripheral surface and an inner peripheral surface of the first concave part, respectively.

3. The battery cell according to claim 1, wherein in a thickness direction of the end cap, the liquid outlet surface is further away from the electrode assembly than the abutting surface.

4. The battery cell according to claim 3, wherein in the thickness direction of the end cap, the flow guiding channel as a whole is closer to the electrode assembly than the liquid outlet surface.

5. The battery cell according to claim 1, wherein the flow guiding channel is a flow guiding groove which is provided at one end of the first convex part away from the cap body.

6. The battery cell according to claim 1, wherein the first convex part is provided with a plurality of flow guiding channels circumferentially arranged at intervals with the liquid injection hole as a center.

7. The battery cell according to claim 1, wherein the flow guiding channel extends along a radial direction of the liquid injection hole.

8. The battery cell according to claim 1, wherein the liquid injection hole and the first convex part are coaxially arranged.

9. The battery cell according to claim 1, wherein the electrode assembly has a central hole, and in a thickness direction of the end cap, the central hole and the liquid injection hole are disposed opposite to each other.

10. A battery, comprising:
the battery cell according to claim 1; and
a box, configured for accommodating the battery cell.

11. An electrical device, comprising the battery according to claim 10.

12. A method of manufacturing a battery cell, the method comprising:
providing an electrode assembly having a first tab;
providing a housing having an opening;
providing an end cap;
making the electrode assembly accommodated in the housing; and
making the end cap cover the opening,
wherein the end cap comprises a cap body and a first convex part, the cap body is configured for connecting with the housing and covering the opening, and the first convex part protrudes from an inner surface of the cap body towards the electrode assembly, and the first convex part is configured to abut against the first tab; the end cap is provided with a liquid injection hole, and the liquid injection hole is configured for allowing the electrolyte solution to enter an interior of the battery cell from outside of the battery cell, and the liquid injection hole is located inside of an outer peripheral surface of the first convex part; the first convex part is provided with a flow guiding channel, and the flow guiding channel is communicated with the liquid injection hole and passes through the outer peripheral surface, the flow guiding channel is configured for allowing the electrolyte solution having entered the liquid injection hole to flow to outside of the outer peripheral surface, wherein
the first convex part is an annular convex structure formed by around the liquid injection hole;
one end of the first convex part away from the cap body is provided with an abutting surface, and the abutting surface is configured for abutting against the first tab; and the end cap is provided with a first concave part which is recessed from the abutting surface in a direction away from the electrode assembly, and the liquid injection hole communicates with the flow guiding channel through the first concave part, wherein the end cap is provided with a liquid outlet surface, and one end of the liquid injection hole penetrates through the outlet surface;

the end cap further comprises:

a second convex part, which is located in the first concave part and protrudes from a bottom surface of the first concave part towards the electrode assembly, and the liquid outlet surface is formed on one end of the second convex part facing the electrode assembly.

\* \* \* \* \*